Dec. 6, 1949 C. S. JONES 2,490,305
PORTABLE MOTOR OPERATED AIR COMPRESSOR
WITH STORAGE TANK
Filed July 16, 1946 2 Sheets-Sheet 1

C. S. Jones,
INVENTOR.

BY
ATTORNEY.

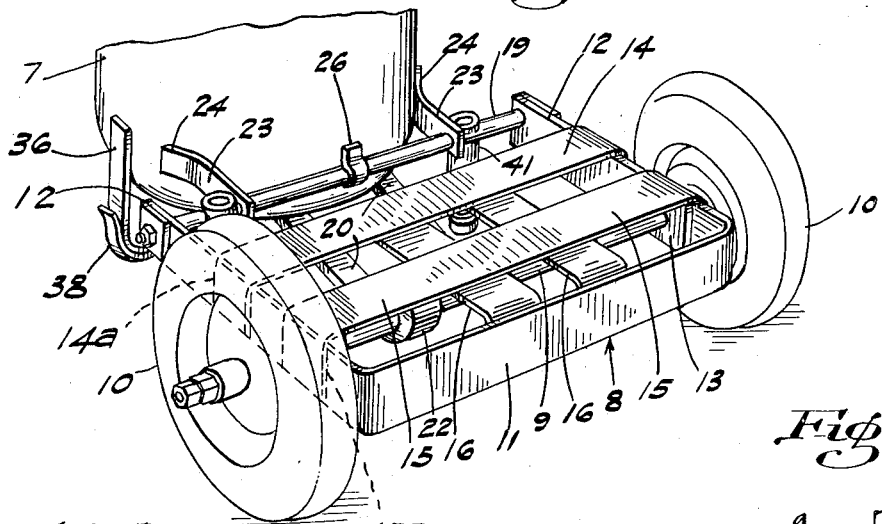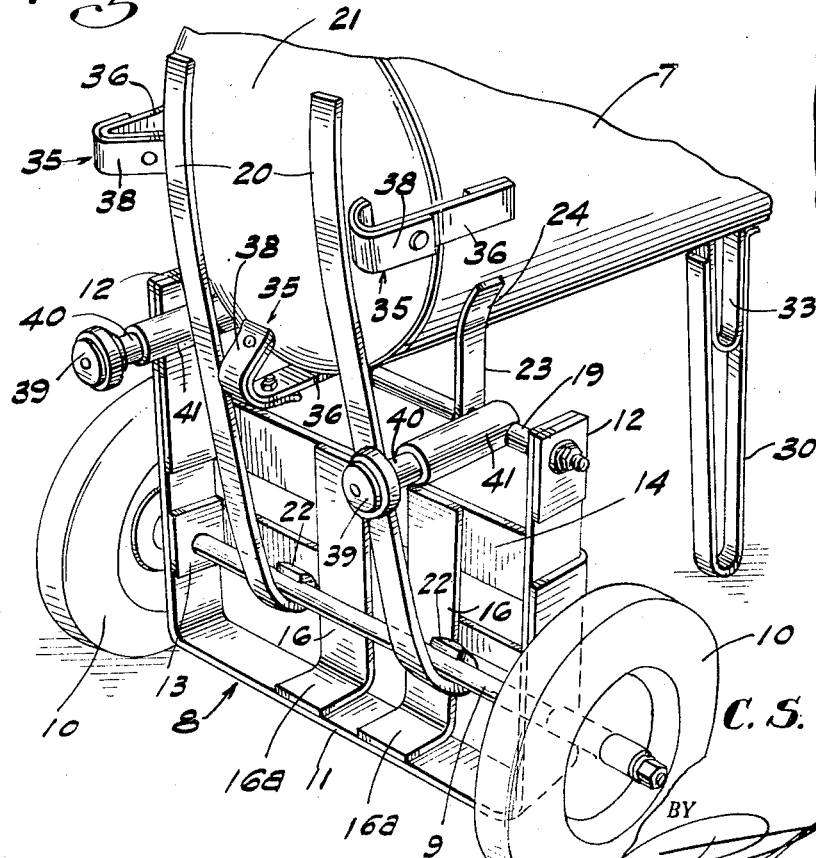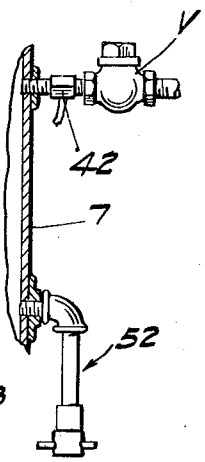

Patented Dec. 6, 1949

2,490,305

UNITED STATES PATENT OFFICE 2,490,305

PORTABLE MOTOR OPERATED AIR COMPRESSOR WITH STORAGE TANK

Charles S. Jones, Los Angeles, Calif.

Application July 16, 1946, Serial No. 683,939

5 Claims. (Cl. 280—5)

This invention relates to an improved portable motor operated air compressor with storage tank.

It is an object of the present invention to improve upon the "portable compressed air tank tire inflator" described and claimed in my United States Patent No. 2,384,174, dated September 4, 1945, said patent disclosing a portable apparatus lacking certain improved features which have been incorporated into the structure which forms the subject matter of the present application.

By combining the motor and compressor or pump with the portable tank a wider range of usefulness is imparted to the device for it is no longer necessary to wheel it alongside a motor driven compressor to renew the air pressure within the tank, but said tank will be replenished by a pump and motor supported therewith upon the same running gear. This invention improves upon a device of the kind just mentioned in that it provides for the use of only two ground wheels for transportation purposes.

Additional objects are to provide a superior arrangement of the air storage tank and cooperating parts upon a single chassis forming a part of a manually propellable two wheeled cart; to provide a more compact and less clumsy means to propel and operate devices of the kind; and to provide a device particularly well adapted to be disposed in a canted position in close quarters, notwithstanding its considerable, necessary dimensions.

Another, more specific object is to provide an improved, platform-forming arrangement of reinforced strap metal parts which are particularly well adapted for mounting upon the wheel axle of a cart, there to be utilized to support a pump, motor and tank to contain compressed fluid. Also, it is an object to provide means attached to the tank for shielding the pump and motor when the parts are thus assembled.

Still another object is to provide shock-absorbing means carried by the cart to dissipate the shock that the storage tank would otherwise encounter when up-ended.

Other objects, advantages and features of invention will hereinafter appear.

Referring to the accompanying drawings, which illustrate a preferred embodiment of the invention, Fig. 1 is a side elevation of the device showing how the tank appears both in its horizontal and upstanding positions.

Fig. 2 is a perspective view wherein the upper portion of the tank is broken away in order to contract the view, said tank being located at the side of the chassis farthest from the observer. The chassis is shown untilted and without the motor and pump which it supports.

Fig. 3 is a perspective view, the greater part of the tank, which is in its down position, being broken away to contract the view. The motor and pump are also omitted in this view and one of the shock absorbers is fragmentarily shown.

Fig. 4 is a fragmentary sectional view showing a portion of the tank wall, air inlet conduit and water drain therebelow.

Figures 1, 5:
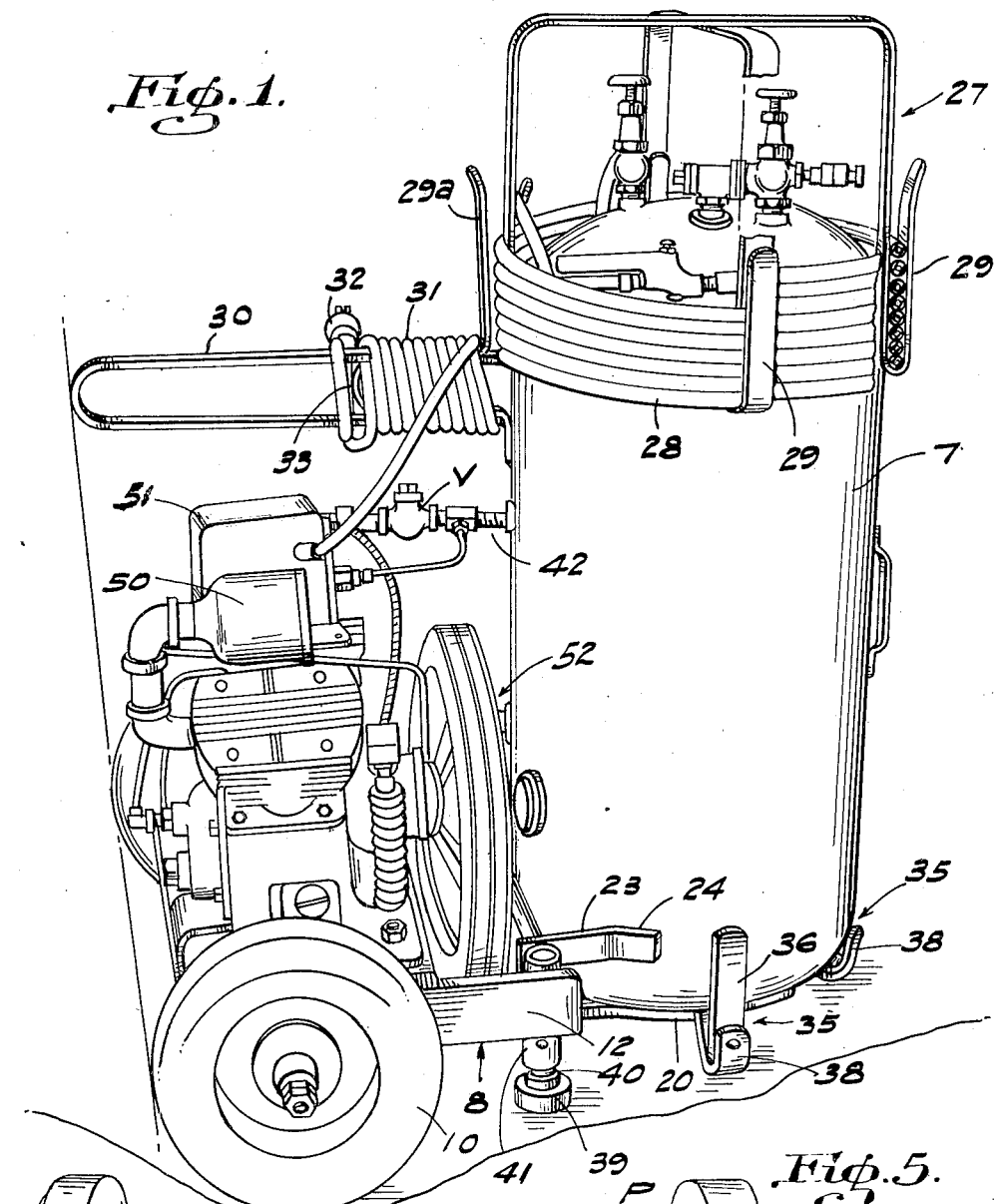
Fig. 5 is a fragmentary rear perspective view of the device, fragments of the motor and compressor being shown.

Referring in detail to the drawings, the important parts of the structure shown are the elongated enclosed cylindrical, metal, high pressure tank 7 to contain compressed air, said tank being mounted upon a cart comprising a rectangular bed member or platform 8 rockably supported upon the wheel axle 9 of the single pair of ground wheels 10.

As viewed in Fig. 3 the platform 8 is seen to comprise a marginal strap iron member having a back run 11 and twin side runs 12, said side runs being apertured near their back ends to allow the wheel shaft or axle 9 to pass through them, internal bearing blocks 13 being secured to said apertured runs through which said axle also passes. Extending over said platform 8 from said to side of the cart is a front strap metal strut 14 and a rear strap metal strut 15. Said struts respectively have their ends provided with down-bent end portions 14a and 15a which, at each side of the cart, are welded to one or the other of the aforesaid side runs 12.

Said platform is additionally reinforced by means of the twin strap iron struts 16, 16 which extend transversely thereof, said struts underlying and being spot welded or otherwise secured to the already mentioned strap iron members 14 and 15. At their rear ends said struts 16 have end portions 16a which are downbent at a right angle so that they abut against the inner face of the back strap metal run 11 of the platform to which they are spot welded or otherwise secured.

A brace rod 19 reinforces the front portion of the platform 8, said rod passing through apertured reinforced front end portions of the strap metal side runs 12 of the platform.

It will be seen from Fig. 5, where the particular bolting of the compressor P and motor M to the platform 8 is shown, that the bases of these members are bolted to the underlying, already mentioned strap metal members 14 and 15, thus securely holding said motor and compressor in their mounted positions. The air compressor shown is a two-stage compressor.

A safety valve V is provided (see Fig. 4) which automatically prevents the motor and air compressor from forcing an excessive amount of air into the tank. The parts just mentioned are all conventional and therefore do not need to be described in detail, but they are so positioned in relation to the platform that when the cart is in a canted, wheeling position it can be transported upon the ground wheels in a balanced fashion without an undue tendency to tilt either toward or away from the operator.

The already mentioned pressure tank 7 is secured to the platform 8 of the cart by means most clearly shown in Figs. 2 and 3. From said views it will be seen that a pair of metal straps 20 are so arranged that one of the end portions of the pair abut in a flatwise manner against the dome shaped tank head 21 to which head they are spot welded, the opposite end portions of said metal straps 20 being provided with hooks 22 which hook around the wheel axle 9.

There are also provided a pair of metal straps 23 having end portions 24 abutting against the curved wall of the tank near one end thereof, to which wall they are welded, the already mentioned rod 19 of the platform passing through the opposite end portions of said straps 23. In addition to the means that have already been described for securing the tank to the platform is shown a hanger clip 26 one end of which is spot welded to the tank in a flatwise manner and the opposite end of which is both curled around and spot welded to said shaft 19.

As described and claimed in my aforementioned prior patent, the upper end portion of the tank is shown in Fig. 1 provided with an upstanding strap metal frame 27 around the basal portion of which may be wound the air hose 28, said frame 27 carrying at its lower end upwardly directed keeper arms 29 to guard against the unwinding of the hose.

There is also provided, in a somewhat downwardly spaced relation to the upper end of the tank as seen in Fig. 1, a strap metal leg 30 which is adapted to have wound upon it the electric cord 31 carrying the plug-in member 32. Said leg 30 is in the form of a sturdy loop adapted to form a prop which aids in supporting the tank when in the horizontal position shown in Fig. 3. Said loop does not extend all the way to the tank but is attached and internally reinforced by means of a second shorted loop 33 fitted between and spot welded or otherwise secured to the limbs of said loop 30. One limb of the main loop 30 is extended to form a keeper arm 29a (see Fig. 1) which cooperates with the already mentioned keeper arms 29.

That end portion of the tank 7 which is attached to the platform 8 is provided on all four sides, ninety degrees from each other, with four J-shaped abutment members 35. Each of said abutment members comprises an inner hook-shaped piece of strap metal 36 having its straight part welded to the side wall of the tank in such a way as to bring the end of its hooked part into a contacting relation to the convex end wall of the tank where it is welded to the tank end at the point of such contact. A curved strap-like rubber shoe 38 is fitted over and riveted or otherwise secured to the convex side of the hook portion of each of said abutment members, these shoes contacting the floor, pavement, etc., upon which the tank is at times vertically positioned. At such times a pair of shock absorbing heads 39 carried by the pistons 40 of the shock absorber cylinders 41 also contact with the surface of the underlying support upon which the ground wheels of the cart are resting. Hence, at such times, the device as a whole has an eight-point support. Said shock-absorbing heads encounter the supporting surface a little in advance of the shoes 38, thus dissipating the shock that the tank would otherwise encounter.

From Figs. 1 and 5 it will be seen that the compressor pump P is mounted upon the upper side of the platform 8 adjacent to one of the ground wheels 10 and the motor M is attached to the same side of the platform adjacent to the other ground wheel. Said compressor is provided with an air filter 50 and pressure regulator 51 whence the air is forced into the tank through a valve controlled conduit 42.

As detailed in Fig. 4 the air intake conduit is located above a valve-controlled water drain outlet conduit 52.

I claim:

1. In a device of the kind described, a cart having an axle supported by ground wheels and a rectangular platform rockably mounted near one of its ends upon said axle so that its opposite end is swingable to and from an upwardly directed position, an elongated high pressure tank, means to secure one end portion of said tank to said platform with the tank's length extending at a right angle to said platform, said securing means including metal straps some having end portions abutting flatwise against the side wall of the tank and others abutting flatwise against one of the ends of the tank, said abutting strap portions being welded to the tank, said platform having a face portion for attachment thereto of an air compressor and a motor to operate said compressor to force air into the tank so that the attached compressor and motor are in a projecting relation to the same face of the platform as the face thereof from which the tank extends, handle means projecting from an end portion of the tank to use in manually propelling the device, and a leg laterally projecting from an end portion of the tank to cooperate with the platform at times to support the tank in a horizontal position, the aforesaid motor and compressor being at such times located between said leg and platform.

2. The subject matter of claim 1, and certain of said straps having end portions hooked to said axle.

3. In a device of the kind described, a cart having an axle supported by ground wheels and a rectangular platform rockably mounted near one of its ends upon said axle so that its opposite end is swingable to and from an upwardly directed position, an elongated high pressure tank, means to secure one end portion of said tank to said platform with the tank's length extending at a right angle to said platform, said securing means including metal straps some having end portions abutting flatwise against the side wall of the tank and others abutting flatwise against one of the ends of the tank, said abutting strap portions being welded to the tank, said platform having a face portion for attachment thereto of an air compressor and a motor to operate said compressor to force air into the tank so that the attached compressor and motor are in a projecting relation to the same face of the platform as the face thereof from which the tank extends, and a leg laterally projecting from an end portion of the tank to cooperate with the platform at times to support the tank in a horizontal position, the aforesaid motor and compressor being at such times located between said leg and platform.

4. In a device of the kind described, a cart having an axle supported by ground wheels and a platform rockably mounted near one of its ends upon said axle so that its opposite end is swingable to and from an upwardly directed position, an elongated high pressure tank, means to secure one end portion of said tank to said platform with the tank's length extending at a right angle to said platform, said platform having a face portion for attachment thereto of an air compressor and motor to operate said compressor to force air into the tank so that the attached compressor and motor are in a projecting relation to the same face of the platform as the face thereof from which the tank extends, and a leg laterally projecting from an end portion of the tank to cooperate with the platform at times to support the tank in a horizontal position, the aforesaid motor and compressor being at such times protectively located between said leg and platform.

5. The subject matter of claim 4 and, said securing means including metal straps some having end portions abutting flatwise against the side wall of the tank and others abutting flatwise against one of the ends of the tank, said abutting strap portions being welded to the tank.

CHARLES S. JONES.

REFERENCES CITED

The following references are of record in the file of this patent:

UNITED STATES PATENTS

| Number | Name | Date |
|---|---|---|
| 1,245,243 | Lapham | Nov. 6, 1917 |
| 1,566,067 | Berkeley | Dec. 15, 1925 |
| 1,661,498 | Peck | Mar. 6, 1928 |
| 1,756,806 | Beach | Apr. 29, 1930 |
| 2,122,656 | Paget | July 5, 1938 |
| 2,131,673 | Robinson | Sept. 27, 1938 |
| 2,141,881 | Schray | Dec. 27, 1938 |
| 2,313,868 | Garlinghouse | Mar. 16, 1943 |
| 2,384,174 | Jones | Sept. 4, 1945 |